3,752,729
STRENGTHENED GLASS ARTICLE
Ellen L. Mochel, Painted Post, N.Y., assignor to Corning Glass Works, Corning, N.Y.
No Drawing. Filed May 16, 1966, Ser. No. 550,121
Int. Cl. C03c 3/20, 17/06
U.S. Cl. 161—1    3 Claims

ABSTRACT OF THE DISCLOSURE

This invention relates to improved glass compositions for use in chemical strengthening wherein the position shape of the temperature versus log viscosity curve is changed by the addition of MgO and optionally $K_2O$ to the glass.

---

The chemical strengthening of glass articles, as the expression is used herein, is generally described in British patent specification No. 917,388. As is explained therein, a surface layer of compressive stress is induced in a glass article through an ion exchange mechanism. Thus, a glass containing a relatively small monovalent ion, usually an alkali metal ion, is brought into contact with an external source of a relatively large monovalent ion, also usually an alkali metal ion, at a temperature at or below the strain point of the glass. This contact is maintained for a sufficient length of time to permit the migration of the ions having a relatively small ionic diameter out of the glass surface and the migration of the ions having a relatively large ionic diameter into those sites previously occupied by the smaller ions. This treatment is conducted at or below the strain point of the glass to avoid release of the compressive stresses developed in the glass surface through the exchange of ions therein.

My pending applications, Ser. Nos. 181,887 and 181,888, filed Mar. 23, 1962, point out the unique strengthening effect which can be attained when this ion exchange process is applied to an article formed from a silicate glass containing 5–25% by weight of $Na_2O$ and 5–25% by weight of $Al_2O_3$ and/or $ZrO_2$. These applications graphically illustrate that articles formed from such glass compositions can be strengthened to very high values through an ion exchange treatment of relatively short duration and this increased strength is maintained even after severe surface abrasion. These applications further indicate that the optimum strengthening potential is provided in a simple ternary glass, i.e., a glass composed essentially entirely of $SiO_2$, $Al_2O_3$ and/or $ZrO_2$, and the oxide of the exchangeable alkali metal ion, e.g., $Na_2O$. Nevertheless, other physical characteristics of such ternary glasses are frequently quite unfavorable, resulting in severe limitations in their production and use.

In general, the degree of strength that is exhibited by these ternary glasses increases with the amount of $Al_2O_3$ and/or $ZrO_2$ included in the composition. Unfortunately, however, the viscosity characteristics of glasses containing high contents of $Al_2O_3$ and/or $ZrO_2$ present a particularly serious problem. These glasses tend to have a relatively flat viscosity curve, such a curve being a graphical representation of log viscosity and temperature. This indicates that the viscosity of the glass decreases relatively slowly as the temperature of the glass is raised. As a consequence of this behavior, the temperature at which the glass has a viscosity sufficiently low to insure a homogeneous melt is too high for conventional glass melting techniques. Or, expressed in another manner, where such a glass may have a desirable strain point, the melting temperature thereof will be excessively high for common glassmaking practice.

The use of fluxing oxides to reduce the temperature at which a glass batch can be melted is widespread in the art. The utility of the alkali metal oxides as fluxes in glasses in especially well-known. However, in the aluminosilicate and zirconia silicate glasses particularly well adapted for chemical strengthening, these oxides act to shift the entire log viscosity-temperature curve. Hence, while the additions of these oxides make it possible to decrease the melting temperatures of these glasses, the strain points of the glasses are also lowered. This decrease in strain point means that the temperature of the chemical strengthening process and the maximum service temperature of the strengthened article are reduced because of the thermal stress release factor.

Another element in glass melting practice which must be considered is batch material cost. It is commercially desirable to compound glass batches from readily available natural minerals because of their relatively low cost. Normally, these raw materials contain a variety of constituent oxides and cannot be utilized where a relatively pure or simple form of glass is sought.

I have discovered that the addition of MgO to the sodium aluminosilicate and sodium zirconia silicate glasses which exhibit exceptional chemical strengthening characteristics will markedly steepen the log viscosity-temperature curves of these glasses, such that the temperature interval therein between the strain point and the melting temperature is reduced. Furthermore, where the amount of MgO introduced does not exceed about 5% by weight, the chemical strengthening potential of the glass is not impaired and may even, in some instances, be improved.

I have also discovered that relatively small amounts of $K_2O$ may be present in the glass without deleteriously affecting the chemical strengthening potential of the glass. The addition of $K_2O$ acts to raise the strain point of the glass quite sharply while simultaneously causing a slight increase in the melting temperature of the glass. However, the rise in melting temperature can be compensated for by the presence of MgO. The overall effect of the addition of $K_2O$ and MgO is to yield a glass having a higher strain point but with no significant change in melting temperature. The higher strain point of the glass permits the chemical strengthening process to be carried out at a higher temperature and raises the maximum temperature at which the strengthened article can be used in service. Another advantage, from an economic standpoint, of including a small amount of $K_2O$ in alumina-containing glasses lies in the fact that the $Al_2O_3$ can be added as a natural mineral, e.g., nepheline syenite.

My invention, then, yields a chemically strengthened silicate glass article having a base composition consisting essentially, by weight, of 5–25% $Na_2O$, 5–25% $Al_2O_3$ and/or $ZrO_2$, and the remainder $SiO_2$, the sum of the $Na_2O$, $Al_2O_3$ and/or $ZrO_2$, and $SiO_2$ totalling at least 80% by weight of the base glass composition, which, through the inclusion of 1–5% by weight of MgO in the glass composition, has a much steeper log viscosity-temperature curve than the base glass, but which exhibits essentially the same strength as the base glass after the chemical strengthening process. The optional inclusion of $K_2O$ in amounts up to 5% by weight is beneficial in that it frequently raises the strain point of the glass and, in alumina-containing glasses, allows the $Al_2O_3$ to be added as a naturally-occurring mineral.

The chemically strengthened articles of this invention are characterized in having an interior portion consisting of the base glass composition and a compressively stressed surface layer of at least 5 microns in depth having a composition chemically altered from that of the base glass in that the surface layer has a lesser content of the sodium ion but with a correspondingly greater content of a monovalent ion having a larger ionic diameter than the sodium ion. Thus, on an ionic basis, the content of the sodium ion lost is equivalent to the content of the larger monovalent ion replacing it in the surface layer. Preferably, the base glass consists essentially, by weight on the oxide basis, of 10–25% $Na_2O$, 10–25% $Al_2O_3$ and/or $ZrO_2$, 1–5% MgO, 0–5% $K_2O$, and the balance $SiO_2$, the total $Na_2O$, $Al_2O_3$, $ZrO_2$, MgO, $K_2O$, and $SiO_2$ constituting at least 90% by weight of the base glass.

In the practice of the invention, a glass-forming batch of the desired composition is compounded, the components thoroughly mixed together, and then melted. The melt is then simultaneously cooled to a glass and an article of a desired configuration shaped therefrom. The article produced is thereafter subjected to a chemical strengthening process wherein a source of monovalent ions having an ionic diameter greater than sodium is brought into contact with a surface of the article at an elevated temperature below that at which stress relaxation occurs. Stress released is a function of time and temperature and temperatures above the strain point of the glass cause too rapid relaxation of stresses to be useful in the strengthening process. Therefore, treating temperatures at and, preferably, ranging 50°–200° C. below the strain point of the glass are utilized.

A convenient manner of strengthening treatment contemplates immersing the article in a molten bath of a salt containing the larger monovalent ion which is to be exchanged with the sodium ion in the glass, the salt bath being maintained at a temperature about 50°–200° C. below the strain point of the glass to be strengthened. Typically, for the glasses of this invention, the treatment may be for a period of time varying from about 2–16 hours at a temperature within the range 350°–550° C.

For commercial practice, potassium ions are exchanged for sodium ions, a useful product being obtained through a 5–6 hour immersion of the glass article in a molten potassium nitrate ($KNO_3$) bath operating at 525° C. The glass articles of this invention exhibit a modulus of rupture in excess of 30,000 p.s.i.

The depth of the ion exchanged surface layer is a function of the time of treatment and the temperature at which the ion exchange is conducted. The depth of the ion exchanged layer required for any given service application is dependent upon the degree or severity of surface abrasion encountered in that application. For example, a depth of 5 microns can be adequate where the article will be subject to essentially no abrasion. However, where the article will be subject to mild abrasion, such as that simulated by rubbing with 150 grit abrasive paper, a depth of 20–25 microns will be required to insure against loss of strength due to a crack penetrating beneath a compressive stress layer. Finally, where the service application entails severe abrasion, such as is simulated in the tumble abrasion tests described in my earlier-cited pending applications, a depth of layer of 80 microns or more may be required.

The viscosity characteristics of a given glass can be completely described or illustrated only by means of a full log viscosity-temperature curve. Such a curve is a graphical plot of glass viscosity at all temperatures from below the strain point of the glass to a temperature in the vicinity of the melting point of the glass. Nevertheless, in determining the particular utility of glasses for the present invention it is sufficient to measure selected points on the curve. One point of particular interest is that referred to as the strain point or strain temperature. This point is considered in the glass art to be the temperature at which the viscosity of the glass is $10^{14.5}$ poises. Another point of special interest in the present invention is a temperature in or close to the melting range of the glass. A temperature at which the viscosity of the glass is 2000 poises has been arbitrarily chosen as a basis for comparison. While these temperatures are obviously individually significant, it is also readily apparent that the difference between them is of great significance in demonstrating the effect of MgO on the viscosity-temperature characteristics of any given glass.

The invention is further described and illustrated with reference to a series of sodium aluminosilicate glasses having the compositions, given in weight percent on the oxide basis as calculated from the glass batch, as set out in Table I. The batch components may be comprised of any materials, either oxides or other compounds, which, on being fused together to form a melt, are converted to the desired oxide compositions in the proper proportions. The table also records the temperature at which a melt of the glass has a viscosity of 2000 poises ($T_{2000}$), the strain point of the glass ($T_{S.P.}$) and the difference between these two values ($T_{2000}-T_{S.P.}$). Finally, measurements of the modulus of rupture (M.O.R.) in p.s.i. are listed therein as determined in the conventional manner on ¼" diameter cane prepared from each glass composition and chemically strengthened by immersion in a $KNO_3$ salt bath for 5 hours at 525° C. followed by the tumble abrasion of the glass surface.

TABLE I

|  | 1 | 2 | 3 | 4 | 5 | 6 | 7 | 8 |
|---|---|---|---|---|---|---|---|---|
| $SiO_2$ | 60.5 | 58.5 | 62.0 | 61.0 | 61.0 | 60.0 | 65.6 | 62.0 |
| $Al_2O_3$ | 20.0 | 20.0 | 18.0 | 18.0 | 18.0 | 18.0 | 17.0 | 17.0 |
| $Na_2O$ | 15.0 | 15.0 | 11.8 | 11.8 | 12.5 | 12.5 | 13.0 | 13.0 |
| $K_2O$ |  |  | 3.7 | 3.7 | 4.0 | 4.0 | 3.7 | 3.7 |
| $TiO_2$ | 3.0 | 3.0 | 2.0 | 2.0 | 2.0 | 2.0 |  |  |
| MgO |  | 2.0 | 1.6 | 2.6 | 1.6 | 2.6 |  | 3.6 |
| CaO |  |  | 0.4 | 0.4 | 0.4 | 0.4 | 0.2 | .2 |
| F | 1.0 | 1.0 |  |  |  |  |  |  |
| $As_2O_3$ | 0.5 | 0.5 | 0.5 | 0.5 | 0.5 | 0.5 | 0.5 | 0.5 |
| $T_{2000}$ | 1,457 | 1,400 | 1,442 | 1,428 | 1,427 | 1,406 | 1,478 | 1,423 |
| $T°_{S.P.}$ | 553 | 553 | 592 | 593 | 585 | 579 | 536 | 588 |
| ($T_{2000}-T°_{S.P.}$) | 904 | 847 | 850 | 835 | 842 | 827 | 942 | 835 |
| M.O.R. (p.s.i.) | 72,000 | 67,100 | 77,800 | 71,000 | 68,400 | 68,100 | 67,000 | 65,000 |

Table II illustrates my invention as applied to sodium silicate glasses containing $ZrO_2$ alone or a combination of $Al_2O_3$ and $ZrO_2$. Here, as in Table I, the components are reported in weight percent on the oxide basis as calculated from the batch. Modulus of rupture measurements were made on ¼" diameter cane which had been chemically strengthened by immersion in a $KNO_3$ salt bath for five hours at 525° C. and then subjected to tumble abrasion.

TABLE II

|  | 9 | 10 | 11 | 12 |
|---|---|---|---|---|
| $SiO_2$ | 57.83 | 55.83 | 60.5 | 58.5 |
| $Al_2O_3$ | 10.0 | 10.0 |  |  |
| $Na_2O$ | 16.0 | 16.0 | 16.0 | 16.0 |
| $K_2O$ | 3.0 | 3.0 | 3.0 | 3.0 |
| MgO |  | 2.0 |  | 2.0 |
| CaO | 0.17 | 0.17 |  |  |
| $ZrO_2$ | 12.0 | 12.0 | 20.0 | 20.0 |
| $As_2O_3$ | 0.5 | 0.5 | 0.5 | 0.5 |
| $T_{2000}$ | 1,300° | 1,268° | 1,268° | 1,265° |
| $T_{S.P.}$ | 545° | 580° | 572° | 665° |
| $T_{2000}-T_{S.P.}$ | 755° | 688° | 696° | 600° |
| M.O.R. | 45,200 | 68,700 | 58,500 | 57,400 |

A study of the examples recorded in Tables I and II quickly demonstrates the dramatic effect which a very minor addition of MgO has upon the viscosity characteristics of the aluminosilicate and zirconia silicate glasses of this invention. Yet, as the modulus of rupture figures illustrate, the strength of the bodies is not significantly adversely affected in any of the compositions and the substitution of 2% MgO for 2% $SiO_2$ in Example 9 actually serves to improve the strength thereof (Example 10).

These tables demonstrate that the addition of MgO to the glasses affects the viscosity characteristics thereof in two beneficial ways: (1) the melting temperature of the glass is reduced, and (2) the strain point of the glass is raised. This rise in the strain point enables the chemical strengthening treatment to be carried out at a higher temperature and, therefore, the ion exchange will be completed more rapidly, increasing the rate at which a process can be conducted always being important from a commercial standpoint. Also, this rise in strain point permits the strengthened product to be used at higher temperatures since thermal release of the induced compressive stresses will not occur until the temperature approaches the strain point.

I claim:

1. A chemically strengthened glass article exhibiting a modulus of rupture of at least 30,000 p.s.i. after being subjected to surface abrasion composed of an interior portion and a surface compressive stress layer of at least 5 microns in depth, said interior portion comprising a base glass consisting essentially, by weight on the oxide basis, of 5–25% $Na_2O$, 5–25% total of at least one member selected from the group consisting of $Al_2O_3$ and $ZrO_2$, and the remainder $SiO_2$, the total $Na_2O$, $Al_2O_3$, $ZrO_2$, and $SiO_2$ constituting at least 80% by weight of the glass composition, and said surface layer having a composition chemically altered from that of the base glass to the extent that said surface layer has a lesser content of sodium with a correspondingly greater content on an ionic basis of a monovalent ion having a larger ionic diameter than sodium, said glass article being characterized by a base glass containing 1–5% by weight MgO to lower the melting point of the base glass and to decrease the difference in temperature between the strain point and the melting point of said base glass.

2. A glass article according to claim 1 wherein the base glass composition contains up to 5% $K_2O$.

3. A glass article according to claim 1 wherein the base glass consists essentially, by weight on the oxide basis, of 1–5% MgO, 0–5% $K_2O$, 10–25% $Na_2O$, 10–25% total of at least one member selected from the group consisting of $Al_2O_3$ and $ZrO_2$, and the remainder $SiO_2$, the total MgO, $K_2O$, $Na_2O$, $Al_2O_3$, $ZrO_2$, and $SiO_2$ constituting at least 90% by weight of said base glass.

References Cited

FOREIGN PATENTS 2,352    5/1962    Republic of South Africa
                                                 65—30

ROBERT L. LINDSAY, JR., Primary Examiner

U.S. Cl. X.R.

65—30; 106—52; 161—164, 166